Sept. 22, 1959     E. R. HICKEL     2,904,947
ROTARY LAWN MOWERS AND EDGE TRIMMERS Filed Oct. 21, 1957

INVENTOR.
Elmer R. Hickel
BY Frank J. Schraeder Jr.
Attorney

United States Patent Office 2,904,947
Patented Sept. 22, 1959

2,904,947

ROTARY LAWN MOWERS AND EDGE TRIMMERS

Elmer R. Hickel, Wichita, Kans.

Application October 21, 1957, Serial No. 691,366

1 Claim. (Cl. 56—25.4)

The present invention relates generally to horizontally disposed rotary blade type lawn mowers and has particular reference to an improved edge trimming feature which may readily be adapted to several mowers that employ a single blade or a plurality of blades rotatable about a vertical axis in a common horizontal plane.

An object of the invention is found in the provision of a horizontally disposed common-plane-contained rotary blade type lawn mower having a casing including elongated comparatively narrow slots or apertures in opposite side walls of the casing adapted to receive therein the outer peripheral edges of a plurality of circularly spaced cutters carried on a rotary mounting plate rotatably propelled by a vertically disposed shaft of a prime mover such as an internal combustion engine mounted on top of the casing; the narrow slots in the opposed side walls of the casing being open at the forward or front edges of the casing walls which slightly slope downwardly outwardly while the parallel edges of the narrow slots 12ª merge into a pair of upwardly and downwardly diverging edges (respectively 12ᵇ and 12ᶜ) of the casing to constitute outwardly flaring mouths adapted to receive therein the upstanding rows of grass while the forwardly moving mower progressively compresses the grass into the restricted areas of the narrow slots 12ª whereat the grass is rapidly successively cut by the sharp edges of the cutters as they pass through the slots.

Another object of the invention resides in providing the opposed side walls of the casing at slightly angularly disposed positions sloping downwardly outwardly with the narrow slots for the cutter blades located close to the bottom edges of the side walls and including a plurality of vertically spaced bearing holes for vertically adjustably mounting the axles of the mower wheels with reference to the rotating cutters for purposes of varying the height of the trimmed grass; the downwardly outwardly sloping side walls and the outwardly flared edges of the open ends of the slots disposed near the lower edges of these walls provide excellent guiding means for progressively fending and feeding the lawn edge into the final restricted area of the slot whereat it is trimmed by the rotating cutters while partially confined within the slot.

The various features of novelty whereby the present invention is characterized will hereinafter be pointed out with particularity in the appended claim, however, for a full understanding of the invention and of its objects and advantages reference may be had to the following detailed description taken in connection with the accompanying drawing, wherein:

Figure 2:
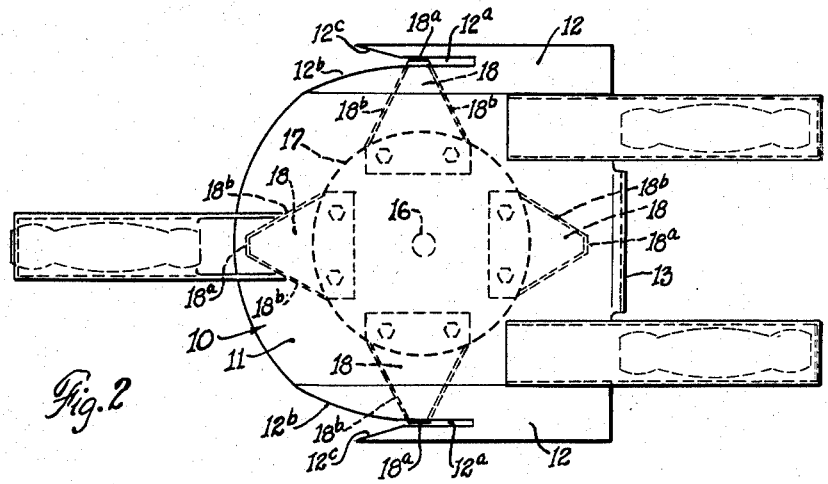
Fig. 2 is a plan view of the mower, the engine being omitted.
Figure 1:
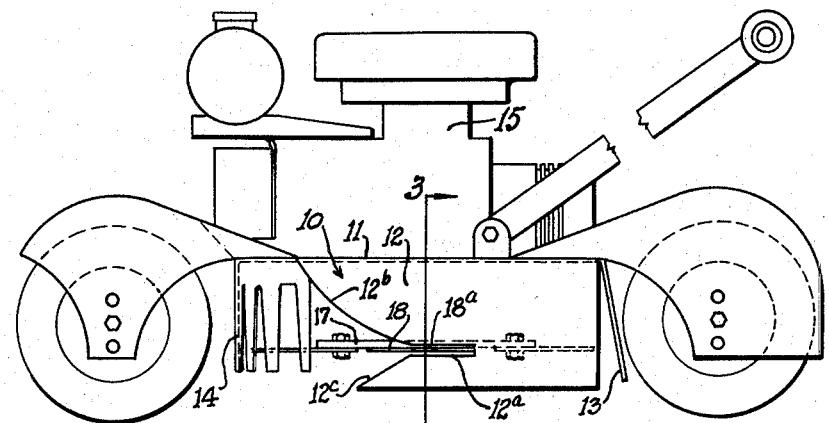
Fig. 1 is a side elevation of a mower embodying a preferred form of my invention.
Figure 3:
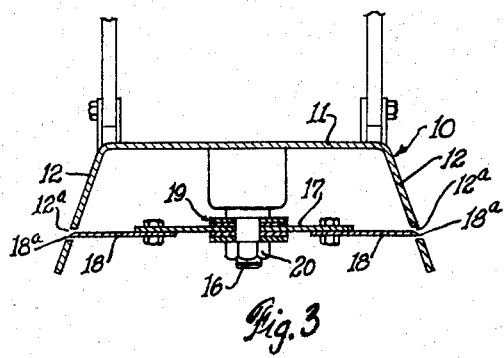
Fig. 3 is a vertical section taken on line 3—3 of Fig. 1.

As shown in the drawing the mower comprises a casing 10 including a top 11, side walls 12 and a rear wall 13. The front end of the casing is open and provided with an arcuate guard 14 consisting of laterally spaced depending teeth; the rear wall 13 being preferably angularly disposed to provide an opening for discharge therethrough of the cut glass.

Mounted on the casing top 11 is any well known prime mover such as an internal combustion engine 15 which drives the vertically disposed shaft 16 that is operatively connected to the circular cutter mounting plate 17. Along the periphery of plate 17, I mount and rigidly affix thereto a plurality of circularly equally spaced cutters 18 of generally triangular shape and each preferably having a short portion of its apex cut off to present a comparatively short sharp cutting edge 18ª disposed between the two relatively angularly disposed sharp cutting sides 18ᵇ; the cutters are so mounted on the mounting plate 17 that their portions between the sharp sides 18ᵇ extend radially outwardly and project beyond the circular peripheral edge of the mounting plate 17 while the diametrical distance between the sharp ends 18ª is equal to the horizontal or transverse distance between the outer faces of the side walls 12 at the longitudinal center-lines of the slots 12ª.

The opposed side walls 12 are provided with horizontally aligned elongated narrow slots or openings 12ª adapted to receive therein the sharp peripheral ends 18ª of the circularly rotating cutters 18 carried on the mounting plate 17 as it is rotated by the engine shaft 16 while mounted to its lower end between a plurality of washers 19 and secured thereto by nut 20.

The opposed side walls 12 are relatively oppositely angularly disposed and are inclined downwardly outwardly to provide excellent guiding means for presenting the edge-trimming facility close to a wall or sidewalk curb; the outwardly flaring edges 12ᵇ and 12ᶜ of the open ends of the slots 12ª disposed near the lower edges of these side walls provide excellent guiding means for progressively fending or gathering the lawn edge into the restricted areas of the slots 12ª whereat it is trimmed by the cutters while partially confined within the slots.

From the foregoing, it is apparent that I have provided a lawn mower which is permanently equipped with the very desirable provision of means for trimming lawn edges close to a wall or walk curb.

It should be noted that the mower is provided with the lawn edge trimming means in connection with both sides of the mower casing so that the lawn edge trimming facilities on either side of the mower may alternately be employed while the mower is moved in the same direction.

I claim:

A lawn mower having a casing including a pair of relatively oppositely inclined side walls each provided with an elongated narrow horizontally disposed slot, rotatable grass cutting means within said casing comprising a plurality of circularly arranged equally spaced cutters rotatable about a vertical axis in a common horizontal plane, the outer peripheral edges of said cutters being movable through portions of said slots, said slots having parallel edges extending forwardly into diverging edges defining forwardly flaring mouths adapted to receive therein the upstanding rows of grass while the forwardly moving mower progressively gathers the grass through the flaring mouths into the restricted areas of the narrow slots whereat the grass is trimmed by the rapidly rotating cutters as they successively pass through the slots.

References Cited in the file of this patent

UNITED STATES PATENTS

| | | |
|---|---|---|
| 2,314,681 | Beatty | Mar. 23, 1943 |
| 2,636,333 | Michaels | Apr. 28, 1953 |
| 2,671,299 | Orr | Mar. 9, 1954 |
| 2,796,715 | Meltzer | June 25, 1957 |
| 2,814,924 | Group et al. | Dec. 3, 1957 |

FOREIGN PATENTS

| | | |
|---|---|---|
| 253,199 | Switzerland | Feb. 29, 1948 |